US011528600B2

United States Patent
Yunusov et al.

(10) Patent No.: US 11,528,600 B2
(45) Date of Patent: Dec. 13, 2022

(54) MASSIVE MIMO PHYSICAL LAYER BASED CRYPTOGRAPHY

(71) Applicant: QUALCOMM Incorporated, San Diego, CA (US)

(72) Inventors: David Yunusov, Holon (IL); Assaf Touboul, Netanya (IL); Gideon Shlomo Kutz, Ramat Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 16/581,039

(22) Filed: Sep. 24, 2019

(65) Prior Publication Data

US 2021/0092592 A1    Mar. 25, 2021

(51) Int. Cl.
*H04W 12/03*    (2021.01)
*H04W 12/041*    (2021.01)
(Continued)

(52) U.S. Cl.
CPC .......... *H04W 12/03* (2021.01); *H04B 7/0413* (2013.01); *H04L 5/0051* (2013.01); *H04L 25/0224* (2013.01); *H04W 12/041* (2021.01)

(58) Field of Classification Search
CPC ............... H04L 5/0051; H04L 25/0224; H04L 25/0228; H04W 12/03; H04W 12/041; H04B 7/0413
See application file for complete search history.

(56) References Cited

U.S. PATENT DOCUMENTS

| | | | |
|---|---|---|---|
| 2007/0140481 A1* | 6/2007 | Parameswaran Rajamma | ............ H04L 9/0891 380/37 |
| 2015/0146584 A1* | 5/2015 | Wang | ................... H04B 7/0665 370/278 |

(Continued)

FOREIGN PATENT DOCUMENTS

WO    2018155884 A1    8/2018

OTHER PUBLICATIONS

Chih-Yao W., et al., "Practical Physical Layer Security Schemes for MIMO-OFDM Systems Using Preceding Matrix Indices", IEEE Journal on Selected Areas in Communications, IEEE Service Center, Piscataway, US, vol. 31, No. 9, Sep. 1, 2013 (Sep. 1, 2013), pp. 1687-1700, XP011524968, ISSN: 0733-8716, DOI: 10.1109/JSAC.2013.130904 [retrieved on Aug. 22, 2013] abstract section I section IV section V.

(Continued)

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a wireless device may receive a sounding waveform via a reciprocal wireless channel. The wireless device may estimate one or more channel parameters associated with the reciprocal wireless channel based at least in part on the sounding waveform. The wireless device may generate a cryptographic key based at least in part on the one or more channel parameters associated with the reciprocal wireless channel. The wireless device may establish a secure communication session over the reciprocal wireless channel based at least in part on the cryptographic key. Numerous other aspects are provided.

30 Claims, 5 Drawing Sheets

(51) Int. Cl.
  *H04B 7/0413* (2017.01)
  *H04L 5/00* (2006.01)
  *H04L 25/02* (2006.01)

(56) References Cited

U.S. PATENT DOCUMENTS

2016/0338050 A1* 11/2016 Kim ................. H04W 4/70
2019/0098497 A1*  3/2019 Shapira ........... H04W 12/041
2019/0199457 A1*  6/2019 Chopra ............ H04B 17/309
2021/0058880 A1*  2/2021 Ghosh ............. H04W 24/08

OTHER PUBLICATIONS

Haji M.F., et al., "Secret Key Generation Using Channel Quantization with SVD for Reciprocal MIMO Channels", 2016 International Symposium on Wireless Communication Systems (ISWCS), IEEE, Sep. 20, 2016 (Sep. 20, 2016), pp. 597-602, XP032981833, DOI: 10.1109/ISWCS.2016.7600974 [retrieved on Oct. 19, 2016] abstract section I section II I section IV.
International Search Report and Written Opinion —PCT/US2020/048919—ISA/EPO—Dec. 1, 2020.

* cited by examiner

MASSIVE MIMO PHYSICAL LAYER BASED CRYPTOGRAPHY

FIELD OF THE DISCLOSURE

Aspects of the present disclosure generally relate to wireless communication and to techniques and apparatuses for massive multiple input multiple output (MIMO) physical layer based cryptography. Some techniques and apparatuses described herein may leverage reciprocal MIMO multipath channel characteristics to generate a cryptographic key that is not shared during a key exchange session.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless device, may include: receiving a sounding waveform via a reciprocal wireless channel; estimating one or more channel parameters associated with the reciprocal wireless channel based at least in part on the sounding waveform; generating a cryptographic key based at least in part on the one or more channel parameters associated with the reciprocal wireless channel; and establishing a secure communication session over the reciprocal wireless channel based at least in part on the cryptographic key.

In some aspects, a wireless device for wireless communication may include a memory and one or more processors operatively coupled to the memory. The memory and the one or more processors may be configured to receive a sounding waveform via a reciprocal wireless channel; estimate one or more channel parameters associated with the reciprocal wireless channel based at least in part on the sounding waveform; generate a cryptographic key based at least in part on the one or more channel parameters associated with the reciprocal wireless channel; and establish a secure communication session over the reciprocal wireless channel based at least in part on the cryptographic key.

In some aspects, a non-transitory computer-readable medium may store one or more instructions for wireless communication. The one or more instructions, when executed by one or more processors of a wireless device, may cause the one or more processors to: receive a sounding waveform via a reciprocal wireless channel; estimate one or more channel parameters associated with the reciprocal wireless channel based at least in part on the sounding waveform; generate a cryptographic key based at least in part on the one or more channel parameters associated with the reciprocal wireless channel; and establish a secure communication session over the reciprocal wireless channel based at least in part on the cryptographic key.

In some aspects, an apparatus for wireless communication may include: means for receiving a sounding waveform via a reciprocal wireless channel; means for estimating one or more channel parameters associated with the reciprocal wireless channel based at least in part on the sounding waveform; means for generating a cryptographic key based at least in part on the one or more channel parameters associated with the reciprocal wireless channel; and means for establishing a secure communication session over the reciprocal wireless channel based at least in part on the cryptographic key.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
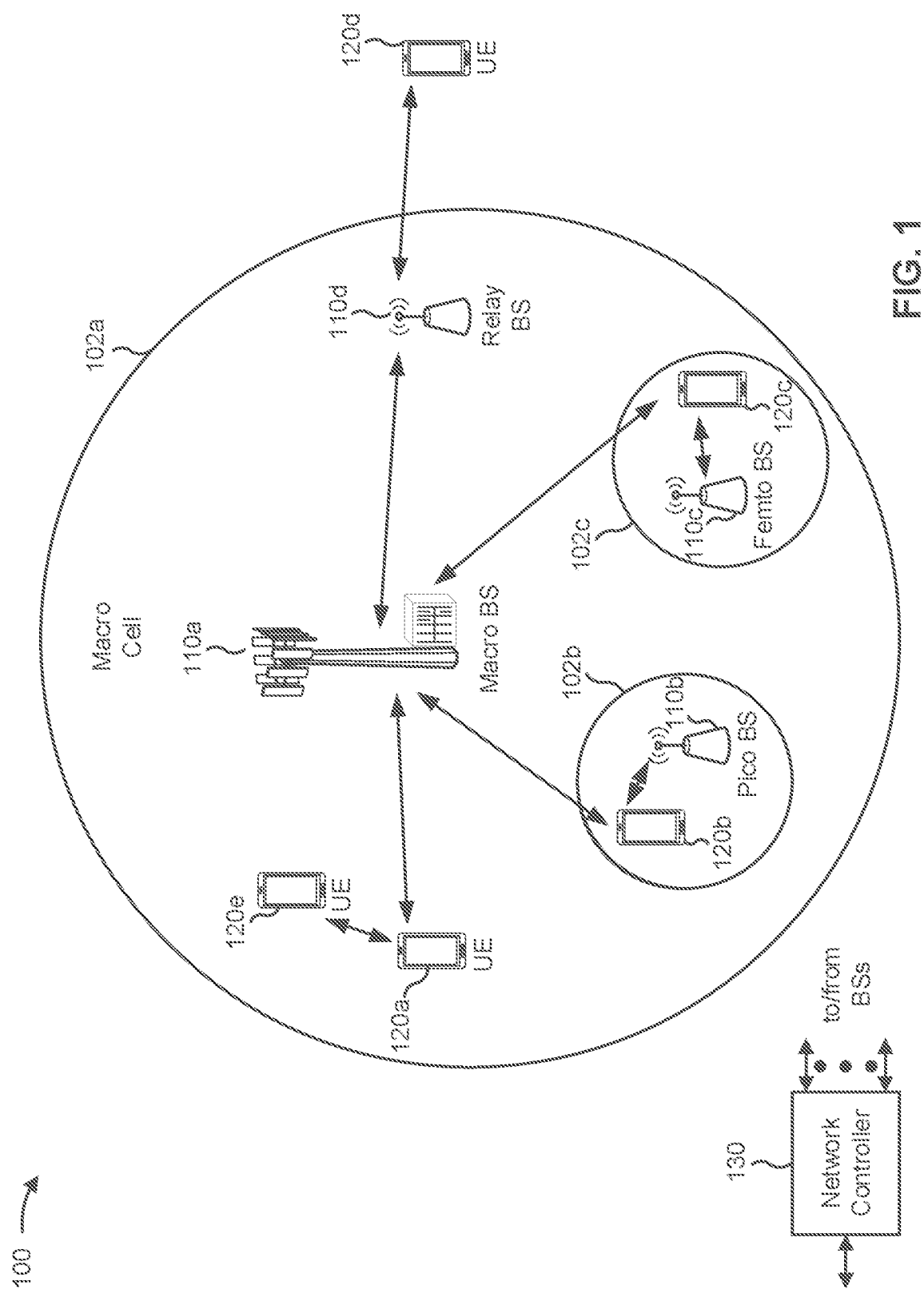
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, a wireless channel, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a wireless or wireline backhaul. The BSs may also communicate with one another (e.g., directly or indirectly) via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
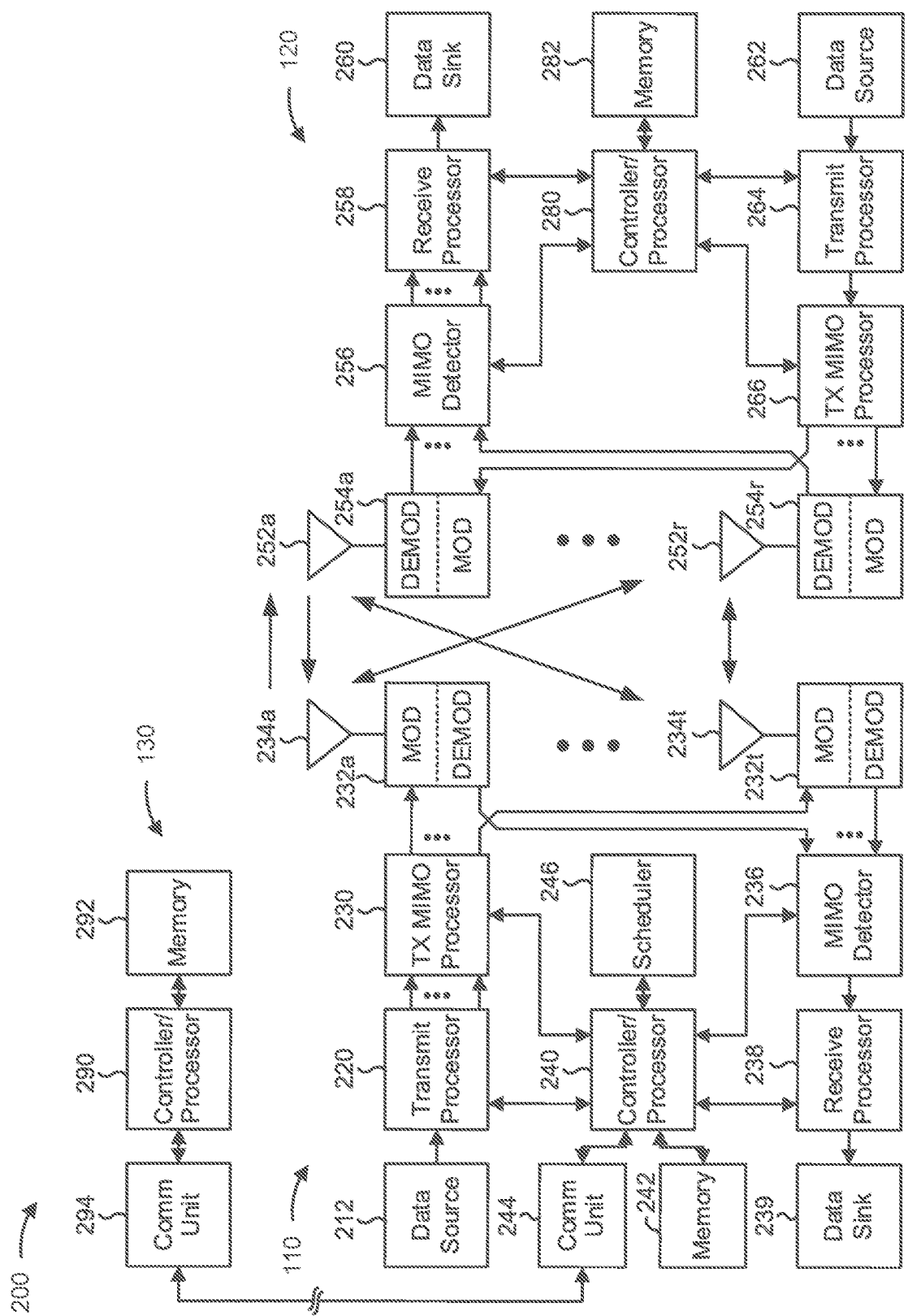
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, and/or any other component(s) of FIG. 2 may perform one or more techniques associated with massive multiple input multiple output (MIMO) physical layer based cryptography. For example, as described in more detail elsewhere herein, controller/processor 240 of base station 110, controller/processor 280 of UE 120, controller/processor 290 of network controller 130, and/or any other component(s) of FIG. 2 may perform one or more techniques to leverage reciprocal MIMO multipath channel characteristics to generate a cryptographic key that is not shared during a key exchange session. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, base station 110, UE 120, network controller 130, and/or the like may include means for receiving a sounding waveform via a reciprocal wireless channel, means for estimating one or more channel parameters associated with the reciprocal wireless channel based at least in part on the sounding waveform, means for generating a cryptographic key based at least in part on the one or more channel parameters associated with the reciprocal wireless channel, means for establishing a secure communication session over the reciprocal wireless channel based at least in part on the cryptographic key, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. Additionally, or alternatively, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. Additionally, or alternatively, such means may include one or more components of network controller 290 described in connection with FIG. 2, such as controller/processor 290, memory 292, communication unit 294, and/or the like.

As indicated above, FIG. 2 is provided as an example. Other examples may differ from what is described with regard to FIG. 2.

When two devices communicate over a wireless channel in a wireless network (e.g., an LTE network, an NR network, and/or the like), traffic that is transmitted over the wireless channel may be ciphered or otherwise encrypted using a cryptographic key. For example, security techniques are typically implemented in wireless networks using a known transmit-receive coding that relies on higher-layer encryption with a secret key (e.g., a symmetric key) that is shared between endpoint devices and used to encrypt plaintext into ciphertext and to decrypt ciphertext into plaintext. Accordingly, to secure the wireless channel and enable confidential communication over the wireless channel, a key exchange session is typically performed at the start of a communication session to negotiate or otherwise exchange the cryptographic key(s) to be used during the communication session. In security protocols that rely upon a key exchange session, the need to exchange the cryptographic key(s) to be used during the communication session is a weakness that an unauthorized user (e.g., an eavesdropper) may exploit. For example, if the unauthorized user is able to access the cryptographic key(s), the unauthorized user may decipher or decrypt data that is communicated during the communication session. In other words, if the two devices cannot establish a secure initial key exchange, the devices will be unable to securely communicate over the wireless channel without the risk of information communicated over the wireless channel being intercepted and decrypted by an unauthorized third party who acquired the secret key during the initial key exchange.

Some aspects described herein provide techniques and apparatuses to coordinate generation of a cryptographic key at different wireless devices without explicitly sharing the cryptographic key between the wireless devices or any parameters that are used to generate the cryptographic key. For example, at the beginning of a communication session, each wireless device may transmit a sounding waveform (e.g., a pilot signal such as a sounding reference signal (SRS), a channel state information reference signal (CSI-RS), and/or the like) that enables the other wireless device to perform channel estimation for a wireless channel between the wireless devices. In some aspects, the wireless channel may be a reciprocal channel, where both transmission links match exactly. For example, one or more electrical characteristics of an antenna used to transmit and receive the sounding waveforms via the reciprocal channel may be the same, such as relative phase, fading, gain, radiation pattern, impedance, bandwidth, resonant frequency, polarization, and/or the like, regardless of whether the antenna is transmitting or receiving. Accordingly, each wireless device may receive a sounding waveform from the other wireless device, and each wireless device may estimate one or more channel parameters based on the sounding waveform received from the other wireless device.

In some aspects, because the wireless channel is reciprocal (e.g., associated with a time division duplexing (TDD) configuration), the one or more channel parameters that are estimated at each wireless device may be identical. Accordingly, the wireless devices may each generate a cryptographic key based on the one or more channel parameters that are estimated based on the sounding waveform received from the other wireless device, and the cryptographic key generated by the wireless devices may match because the wireless devices use a common set of input parameters (e.g., the identical channel parameters that are estimated at each wireless device) to generate the cryptographic key. In other words, the reciprocity of the wireless channel allows each wireless device to arrive at the same estimated channel parameter(s), whereby the wireless devices may independently generate matching cryptographic keys based on the estimated channel parameter(s). In this way, the wireless devices may use the cryptographic key to secure communications over the reciprocal wireless channel without having to perform a key exchange session or otherwise explicitly share the cryptographic key or the channel parameter(s) used to generate the cryptographic key. Furthermore, because channel characteristics would be different at an eavesdropper device at a different physical location (e.g., due to different multipath characteristics, different MIMO channel parameters, and/or the like), the eavesdropper device cannot generate the same cryptographic key as the authorized wireless devices.

Figure 3A:
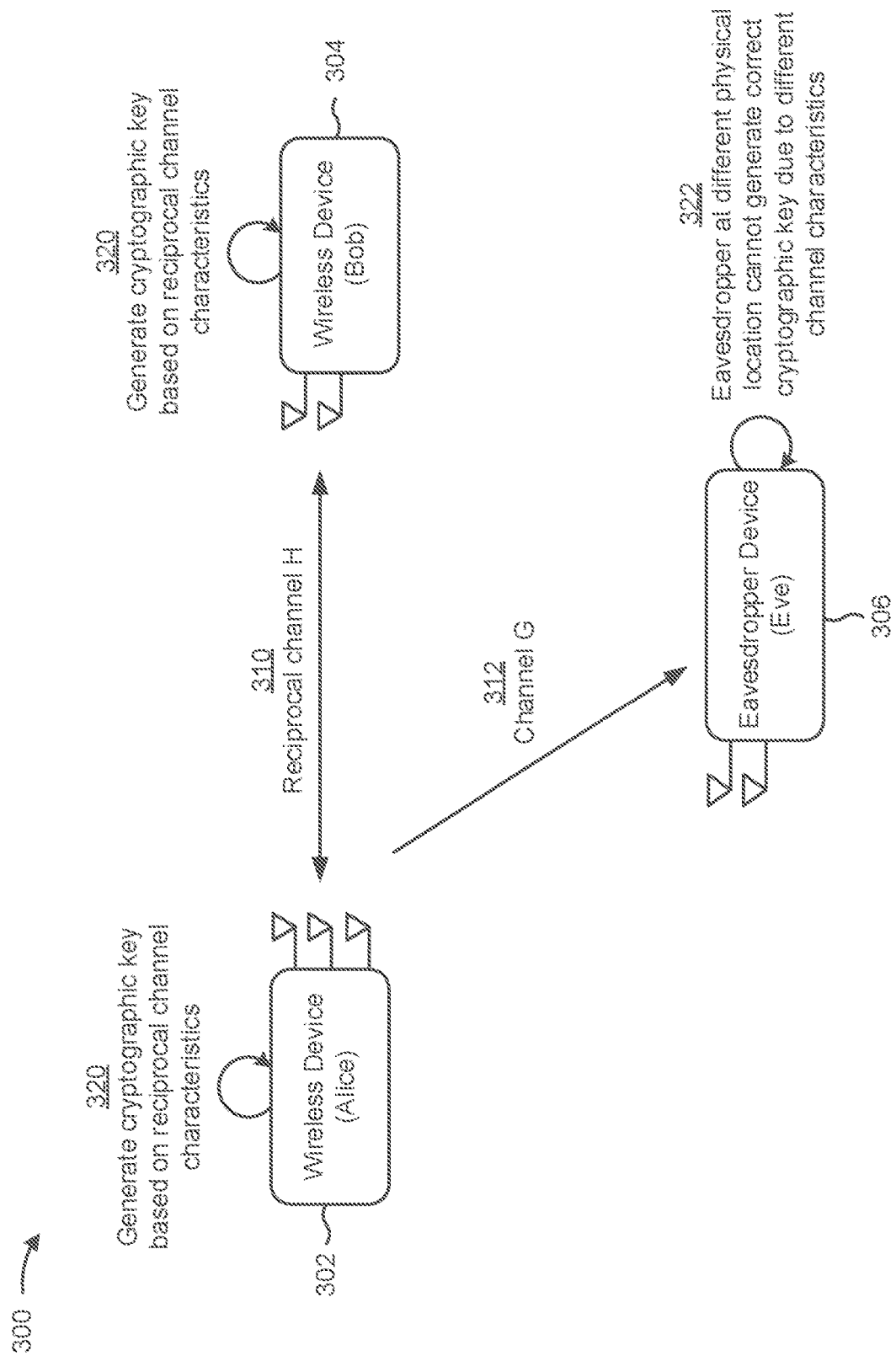
FIGS. 3A-3B are diagrams illustrating example implementations in which communication between endpoint devices is secured using a cryptographic key that the endpoint devices independently generate based on characteristics of a reciprocal wireless channel, in accordance with various aspects of the present disclosure.
Figure 3B:
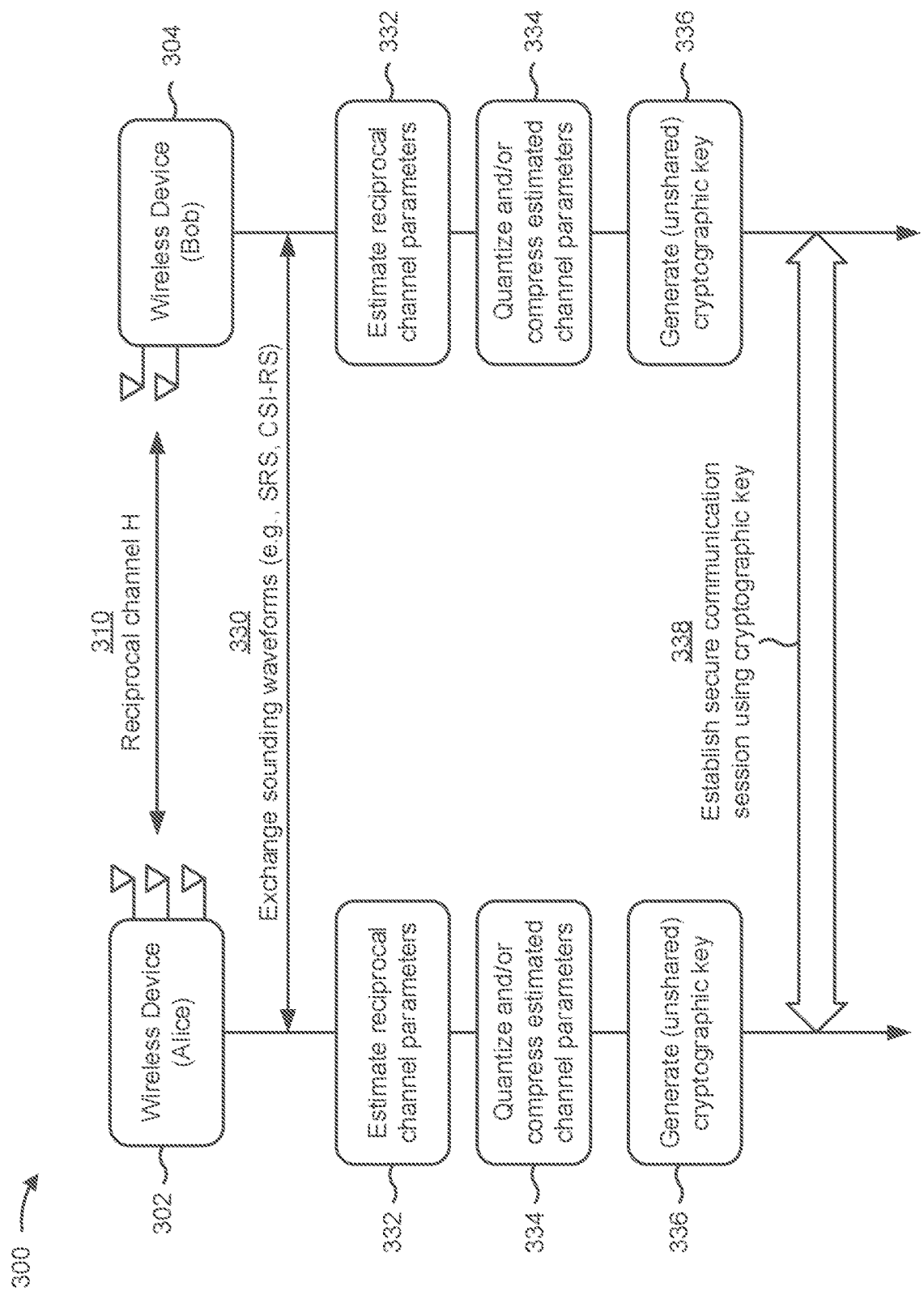

FIGS. 3A-3B are diagrams illustrating example implementations 300 in which communication between endpoint devices is secured using a cryptographic key that the endpoint devices independently generate based on characteristics of a reciprocal wireless channel, in accordance with various aspects of the present disclosure. For example, FIG. 3A illustrates an example in which a first wireless device 302 (Alice) and a second wireless device 304 (Bob) are to establish a secure communication session that is protected against unauthorized access by an eavesdropper device 306 (Eve). In general, the first wireless device 302 and the second wireless device 304 may correspond to a base station and a UE that are communicating via an uplink and a downlink, a pair of UEs that are communicating via a sidelink, a pair of network devices (e.g., a base station, a network controller, a server, and/or the like) that are communicating via a wireless backhaul link, and/or the like.

Furthermore, as shown in FIG. 3A, and by reference number 310, the first wireless device 302 and the second wireless device 304 may be communicating via a reciprocal wireless channel. For example, in some aspects, the first wireless device 302 and the second wireless device 304 may be communicating according to a time division duplexing (TDD) configuration in which transmit operations and receive operations are performed in the same frequency band, whereby channel parameters associated with the reciprocal wireless channel may be substantially identical at the first wireless device 302 and the second wireless device 304. In contrast, as shown by reference number 312, channel parameters at the eavesdropper device 306 may differ from the channel parameters at the first wireless device 302 and the second wireless device 304 because the eavesdropper device 306 is in a different physical location. For example, when the first wireless device 302 and/or the second wireless device 304 transmit an over-the-air signal (e.g., a pilot signal, a reference signal, and/or the like) via the reciprocal wireless channel, the signal may be subject to multipath propagation that results in the signal arriving at the receiving antenna via multiple paths due to refraction and/or reflection from obstacles between the first wireless device 302 and/or the second wireless device 304. Furthermore, in some cases, the signal may be transmitted from multiple transmit antennas and received at multiple receive antennas, whereby the reciprocal channel may be associated with one or more MIMO characteristics in which channel parameters at each pair of transmit and receive antennas are uncorrelated from channel parameters that exist at any other pair of transmit and receive antennas.

Accordingly, because a signal transmitted between the first wireless device 302 and the second wireless device 304 generally exhibits multipath propagation characteristics that depend on a surrounding environment (e.g., the relative positions of the first wireless device 302, the second wireless device 304, obstacles between the first wireless device 302 and the second wireless device 304), the multipath propagation characteristics that exist at the eavesdropper device 306 may differ from the multipath propagation characteristics that exist at the first and second wireless devices 302, 304. In a similar respect, because a given transmission may have different MIMO characteristics for each pair of transmit and receive antennas, the MIMO characteristics that exist at the eavesdropper device 306 may differ from the MIMO characteristics that exist at the first and second wireless devices 302, 304. In other words, the multipath propagation characteristics, the MIMO characteristics, and/or the like may provide a rich set of channel parameters that are uniquely dependent on the spatial relationship and antenna configurations associated with the first wireless device 302 and the second wireless device 304, which cannot be replicated by the eavesdropper device 306 that has a different physical location and different set of antennas.

Accordingly, as shown in FIG. 3A, and by reference number 320, the first wireless device 302 and the second wireless device 304 may each generate a cryptographic key to be used to establish a secure communication session based on one or more estimated channel parameters associated with the reciprocal wireless channel. For example, because the wireless channel between the first wireless device 302 and the second wireless device 304 is reciprocal, the first wireless device 302 and the second wireless device 304 may estimate a common set of channel parameters that can be used to generate the cryptographic key using any suitable encryption algorithm (e.g., Advanced Encryption Standard (AES), a cryptographic hash function, and/or the like). As further shown in FIG. 3A, and by reference number 322, the eavesdropper device 306 at a different physical location cannot generate a correct cryptographic key (i.e., a cryptographic key that matches the cryptographic keys independently generated by the first wireless device 302 and the second wireless device 304) because the channel parameters estimated at the eavesdropper device 306 differ from the channel parameters that are reciprocally estimated by the first and second wireless devices 302, 304.

FIG. 3B illustrates an example call flow that the first wireless device 302 and the second wireless device 304 may perform to generate matching cryptographic keys based on a common set of channel parameters associated with the reciprocal wireless channel between the first wireless device 302 and the second wireless device 304. In particular, as shown by reference number 330, the first wireless device 302 and the second wireless device 304 may initially exchange sounding waveforms to enable channel estimation at the other device. For example, in some aspects, the sounding waveforms may include an SRS, a CSI-RS, a demodulation reference signal (DMRS), a phase tracking reference signal (PTRS), and/or another suitable signal that enables a receiving device to obtain channel state information (CSI). For example, the CSI may generally include one or more parameters to represent how a signal propagates in a path from a transmitting device to the receiving device, and may represent a combined effect of scattering, fading, power decay with distance, and/or the like.

Accordingly, at a start of a communication session, the first wireless device 302 may transmit a sounding waveform to the second wireless device 304, and the second wireless device 304 may transmit a sounding waveform to the first wireless device 302. In some aspects, the first wireless device 302 and the second wireless device 304 may each transmit the sounding waveform to the other device via multiple transmit antennas and receive the sounding waveform transmitted by the other device via multiple receive antennas. In this way, the sounding waveform may be associated with a set of MIMO channel parameters, even in line-of-sight (LOS) conditions where there are few or no obstacles from which to derive CSI that relates to multipath propagation characteristics. In this way, the sounding waveforms may be transmitted and received with unique spatial characteristics (e.g., a relative phase between antennas). Furthermore, in some aspects, the sounding waveforms may be transmitted in a beam sweep, where the wireless devices 302, 304 each transmit the sounding waveform from multiple transmit antennas using multiple beams such that the wireless devices 302, 304 each receive the beam swept sounding waveform at multiple receive antennas. For example, as illustrated in FIGS. 3A-3B, the first wireless device 302 has three antennas and the second wireless device 304 has two antennas.

Accordingly, in some aspects, the first wireless device 302 may transmit the sounding waveform using the three antennas (e.g., in a beam sweep), and the second wireless device 304 may receive the sounding waveform transmitted by the first wireless device 302 at the two antennas. In a similar respect, the second wireless device 304 may transmit the sounding waveform using the two antennas (e.g., in a beam sweep), and the first wireless device 302 may receive the sounding waveform transmitted by the second wireless device 304 at the three antennas. In this way, the sounding waveform may be associated with a set of MIMO parameters to derive the CSI associated with the reciprocal wireless channel, even in LOS conditions (e.g., where there is little or no multipath propagation due to a lack of obstacles to reflect signals). Furthermore, using beamforming functions to transmit and receive the sounding waveforms between each pair of transmit and receive antennas may add richness to the channel parameters (e.g., providing additional channel parameters that uniquely characterize the reciprocal wireless channel), which allows the wireless devices to generate a longer (and thus more secure) cryptographic key.

As further shown in FIG. 3B, and by reference number 332, the first wireless device 302 and the second wireless device 304 may each estimate one or more parameters (e.g., physical layer parameters) associated with the reciprocal wireless channel based on the sounding waveform transmitted by the other wireless device. In some aspects, the first wireless device 302 and the second wireless device 304 may coordinate a set of channel parameters to be estimated (e.g., relative phase, fading, gain, radiation pattern, impedance, bandwidth, resonant frequency, polarization, path loss, multipath delay or propagation time, per-path power, angle of arrival, and/or the like). In this way, the first wireless device 302 and the second wireless device 304 may estimate a common set of channel parameters, and because the wireless channel is reciprocal, the first wireless device 302 and the second wireless device 304 may obtain the same coefficients for the channel parameters. Furthermore, although the eavesdropper device 306 shown in FIG. 3A can receive and perform channel estimation based on the sounding waveforms transmitted by the first wireless device 302 and the second wireless device 304, channel conditions that are estimated at the eavesdropper device 306 will differ from the channel conditions that are estimated by the first wireless device 302 and the second wireless device 304. Accordingly, the eavesdropper device 306 cannot obtain the same coefficients for the channel parameters as the first wireless device 302 and the second wireless device 304.

As further shown in FIG. 3B, and by reference number 334, the first wireless device 302 and the second wireless device 304 may quantize and/or compress the channel parameters estimated based on the sounding waveforms. For example, in some aspects, the channel parameters may be quantized and/or compressed using principal component analysis to remove noise that may be present in the reciprocal wireless channel. In this way, quantizing the estimated channel parameters may ensure, with a sufficiently high probability, that the channel parameters are identically estimated at both wireless devices 302, 304, and compressing the quantized channel parameters may further remove any redundancy or correlation in the estimated channel parameters. Accordingly, as further shown in FIG. 3B, and by reference number 336, the first wireless device 302 and the second wireless device 304 may independently generate a same cryptographic key based on the common set of channel parameters using a suitable key generation algorithm (e.g., AES). In this way, the first wireless device 302 and the second wireless device 304 may both generate the same cryptographic key without performing a key exchange session to explicitly share the cryptographic key or any of the parameters (e.g., channel parameters) used to generate the cryptographic key.

As further shown in FIG. 3B, and by reference number 338, the first wireless device 302 and the second wireless device 304 may then establish a secure communication session using the cryptographic key. For example, in some aspects, information that is communicated between the first wireless device 302 and the second wireless device 304 over the reciprocal channel may be encrypted using the cryptographic key prior to transmission, and because both the first wireless device 302 and the second wireless device 304 have the cryptographic key, both wireless devices 302, 204 may use the cryptographic key to decrypt encrypted information that is received over the reciprocal wireless channel. Additionally, or alternatively, the cryptographic key that is generated using the techniques described herein may be used to augment (e.g., lengthen) an existing encryption key that is shared between the first wireless device 302 and the second wireless device 304. Additionally, or alternatively, the cryptographic key may be used to securely exchange an encryption key over the reciprocal wireless channel.

In some aspects, the first wireless device 302 and the second wireless device 304 may periodically update the cryptographic key to account for time-variant behavior associated with the reciprocal wireless channel (e.g., every slot, every N milliseconds, and/or the like). For example, where one or both wireless devices 302, 304 are mobile or otherwise able to change locations, the channel parameters associated with the reciprocal wireless channel may vary at different locations. For example, multipath propagation characteristics may vary as one or both wireless devices 302, 304 move into and/or out of environments where there are many obstacles, few obstacles, and/or the like. Accordingly, in some aspects, the first wireless device 302 and the second wireless device 304 may periodically exchange the sounding waveforms to update the channel parameters associated with the reciprocal wireless channel and to update the cryptographic key based on the updated channel parameters. In this way, even if the eavesdropper device 306 is somehow able to compromise the cryptographic key used to secure communications via the reciprocal wireless channel, periodically updating the cryptographic key based on time-variant channel parameters may mitigate attacks that the eavesdropper device 306 is able to perform using a compromised cryptographic key.

As indicated above, FIGS. 3A-3B are provided as one or more examples. Other examples may differ from what is described with respect to FIGS. 3A-3B.

Figure 4:
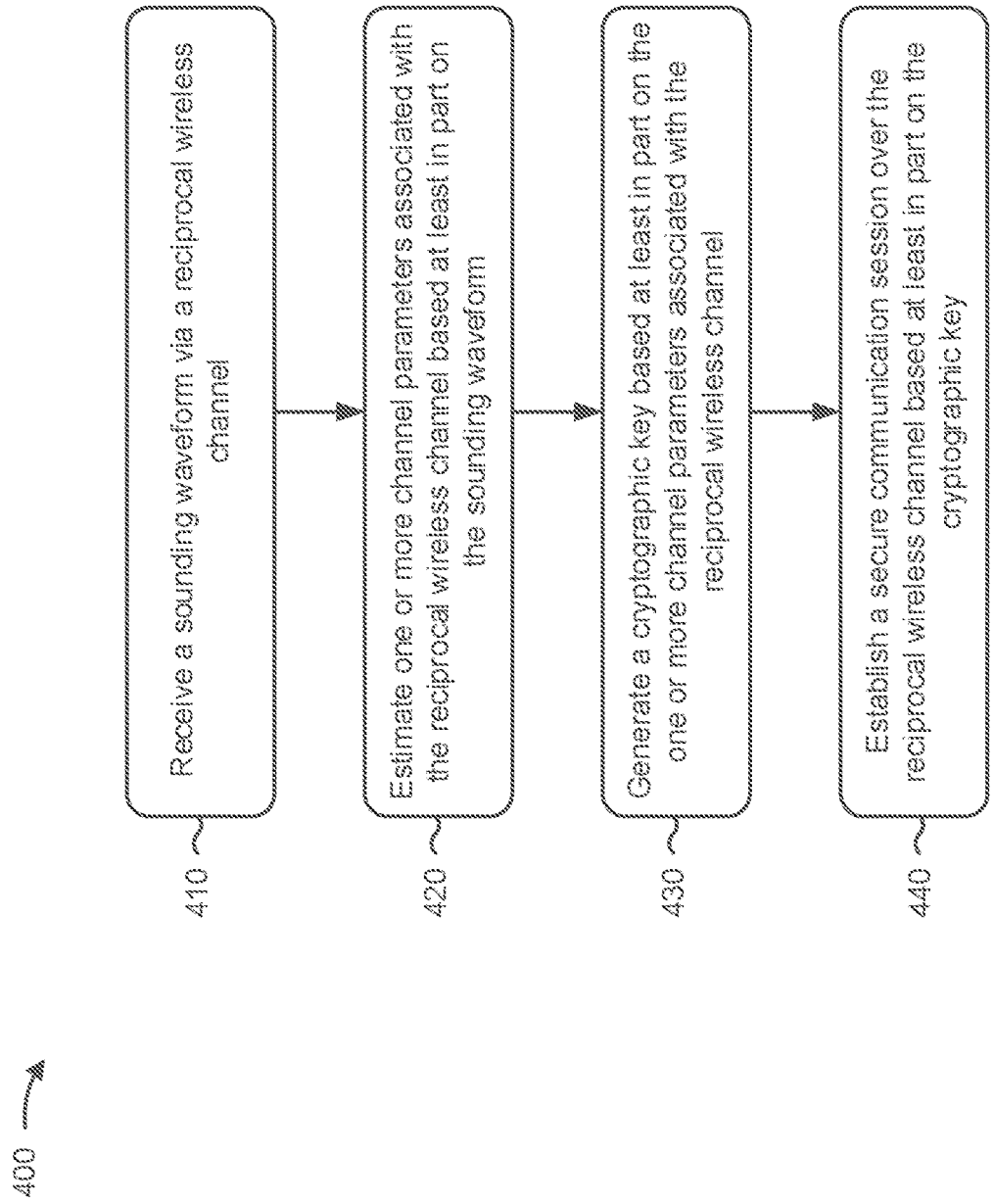
FIG. 4 is a diagram illustrating an example process performed, for example, by a wireless device, in accordance with various aspects of the present disclosure.

FIG. 4 is a diagram illustrating an example process 400 performed, for example, by a wireless device, in accordance with various aspects of the present disclosure. Example process 400 is an example where a wireless device (e.g., base station 110, UE 120, network controller 130, wireless device 302, wireless device 304, and/or the like) performs operations to generate a cryptographic key based on one or more characteristics, parameters, and/or the like associated with a reciprocal wireless channel.

As shown in FIG. 4, in some aspects, process 400 may include receiving a sounding waveform via a reciprocal wireless channel (block 410). For example, the wireless device may receive (e.g., using antenna 234, DEMOD 232, MIMO detector 236, receive processor 238, controller/processor 240, antenna 252, DEMOD 254, MIMO detector 256, receive processor 258, controller/processor 280, controller/processor 290, communication unit 294, and/or the like) a sounding waveform via a reciprocal wireless channel, as described above.

As further shown in FIG. 4, in some aspects, process 400 may include estimating one or more channel parameters associated with the reciprocal wireless channel based at least in part on the sounding waveform (block 420). For example, the wireless device may estimate (e.g., using controller/processor 240, controller/processor 280, controller/processor 290, and/or the like) one or more channel parameters associated with the reciprocal wireless channel based at least in part on the sounding waveform, as described above.

As further shown in FIG. 4, in some aspects, process 400 may include generating a cryptographic key based at least in part on the one or more channel parameters associated with the reciprocal wireless channel (block 430). For example, the wireless device may generate (e.g., using controller/processor 240, controller/processor 280, controller/processor 290, and/or the like) a cryptographic key based at least in part on the one or more channel parameters associated with the reciprocal wireless channel, as described above.

As further shown in FIG. 4, in some aspects, process 400 may include establishing a secure communication session over the reciprocal wireless channel based at least in part on the cryptographic key (block 440). For example, the wireless device may establish (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, controller/processor 290, communication unit 294, and/or the like) a secure communication session over the reciprocal wireless channel based at least in part on the cryptographic key, as described above.

Process 400 may include additional aspects, such as any single aspect or any combination of aspects described below and/or in connection with one or more other processes described elsewhere herein.

In a first aspect, the wireless device transmits a sounding waveform via the reciprocal wireless channel to permit another wireless device at an opposite end of the reciprocal wireless channel to independently generate the cryptographic key based at least in part on the one or more channel parameters associated with the reciprocal wireless channel.

In a second aspect, alone or in combination with the first aspect, the cryptographic key is identical to the cryptographic key that is independently generated by the other wireless device at the opposite end of the reciprocal channel.

In a third aspect, alone or in combination with one or more of the first and second aspects, the one or more channel parameters associated with the reciprocal wireless channel include one or more MIMO and/or multipath characteristics associated with the reciprocal wireless channel.

In a fourth aspect, alone or in combination with one or more of the first through third aspects, the wireless device encrypts information related to the secure communication session using the cryptographic key and transmits the encrypted information related to the secure communication session over the reciprocal wireless channel.

In a fifth aspect, alone or in combination with one or more of the first through fourth aspects, the wireless device receives encrypted information related to the secure communication session over the reciprocal wireless channel and decrypts the encrypted information related to the secure communication session using the cryptographic key.

In a sixth aspect, alone or in combination with one or more of the first through fifth aspects, the wireless device, when establishing the secure communication session, augments an encryption key used to secure communications over the reciprocal wireless channel based at least in part on the cryptographic key that is generated based on the one or more channel parameters associated with the reciprocal wireless channel.

In a seventh aspect, alone or in combination with one or more of the first through sixth aspects, the wireless device, when establishing the secure communication session, uses the cryptographic key to securely exchange an encryption key over the reciprocal wireless channel.

In an eighth aspect, alone or in combination with one or more of the first through seventh aspects, the sounding waveform includes a sounding reference signal, a channel state information reference signal, a demodulation reference signal, a phase tracking reference signal, and/or the like.

In a ninth aspect, alone or in combination with one or more of the first through eighth aspects, the wireless device, when estimating the one or more channel parameters associated with the reciprocal wireless channel, quantizes and/or compresses the one or more channel parameters using principal component analysis.

In a tenth aspect, alone or in combination with one or more of the first through ninth aspects, the sounding waveform is received in a beam sweep in which multiple receive antennas receive the sounding waveform from multiple transmit antennas.

In an eleventh aspect, alone or in combination with one or more of the first through tenth aspects, the one or more channel parameters include a relative phase between one or more transmit antennas and one or more receive antennas.

In a twelfth aspect, alone or in combination with one or more of the first through eleventh aspects, the wireless device periodically exchanges sounding waveforms over the reciprocal wireless channel to update the one or more channel parameters based at least in part on time-variant behavior associated with the reciprocal wireless channel, and update the cryptographic key based at least in part on the one or more channel parameters that are updated using the periodically exchanged sounding waveforms.

In a thirteenth aspect, alone or in combination with one or more of the first through twelfth aspects, the reciprocal wireless channel is an uplink channel, a downlink channel, a sidelink channel, a backhaul channel, and/or the like.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless device, comprising:
   receiving a sounding waveform via a reciprocal wireless channel;
   estimating one or more channel parameters associated with the reciprocal wireless channel based at least in part on the sounding waveform, wherein estimating the one or more channel parameters includes at least one of quantizing or compressing the one or more channel parameters using principal component analysis;
   generating a cryptographic key based at least in part on the one or more channel parameters associated with the reciprocal wireless channel; and
   establishing a secure communication session over the reciprocal wireless channel based at least in part on the cryptographic key.

2. The method of claim 1, further comprising transmitting a sounding waveform via the reciprocal wireless channel to permit another wireless device at an opposite end of the reciprocal wireless channel to independently generate the cryptographic key based at least in part on the one or more channel parameters associated with the reciprocal wireless channel.

3. The method of claim 1, wherein the cryptographic key is identical to a cryptographic key that is independently generated by another wireless device at an opposite end of the reciprocal wireless channel.

4. The method of claim 1, wherein the one or more channel parameters associated with the reciprocal wireless channel include one or more of multiple input multiple output or multipath characteristics associated with the reciprocal wireless channel.

5. The method of claim 1, further comprising:
   encrypting information related to the secure communication session using the cryptographic key; and
   transmitting the encrypted information related to the secure communication session over the reciprocal wireless channel.

6. The method of claim 1, further comprising:
   receiving encrypted information related to the secure communication session over the reciprocal wireless channel; and
   decrypting the encrypted information related to the secure communication session using the cryptographic key.

7. The method of claim 1, wherein establishing the secure communication session includes augmenting an encryption key used to secure communications over the reciprocal wireless channel based at least in part on the cryptographic key that is generated based on the one or more channel parameters associated with the reciprocal wireless channel.

8. The method of claim 1, wherein establishing the secure communication session includes using the cryptographic key to securely exchange an encryption key over the reciprocal wireless channel.

9. The method of claim 1, wherein the sounding waveform includes one or more of a sounding reference signal, a channel state information reference signal, a demodulation reference signal, or a phase tracking reference signal.

10. The method of claim 1, wherein receiving the sounding waveform includes receiving the sounding waveform in a beam sweep via multiple receive antennas.

11. The method of claim 1, wherein the one or more channel parameters include a relative phase corresponding to between one or more receive antennas.

12. The method of claim 1, further comprising:
periodically exchanging sounding waveforms over the reciprocal wireless channel to update the one or more channel parameters based at least in part on time-variant behavior associated with the reciprocal wireless channel; and
updating the cryptographic key based at least in part on the one or more channel parameters that are updated using the periodically exchanged sounding waveforms.

13. The method of claim 1, wherein the reciprocal wireless channel is one or more of an uplink channel, a downlink channel, a sidelink channel, or a backhaul channel.

14. A wireless device for wireless communication, comprising:
a memory; and
one or more processors coupled to the memory, wherein the one or more processors are configured to:
receive a sounding waveform via a reciprocal wireless channel;
estimate one or more channel parameters associated with the reciprocal wireless channel based at least in part on the sounding waveform, wherein the one or more processors, to estimate the one or more channel parameters, are configured to at least one of quantize or compress the one or more channel parameters using principal component analysis;
generate a cryptographic key based at least in part on the one or more channel parameters associated with the reciprocal wireless channel; and
establish a secure communication session over the reciprocal wireless channel based at least in part on the cryptographic key.

15. The wireless device of claim 14, wherein the one or more processors are further configured to transmit a sounding waveform via the reciprocal wireless channel to permit another wireless device at an opposite end of the reciprocal wireless channel to independently generate the cryptographic key based at least in part on the one or more channel parameters associated with the reciprocal wireless channel.

16. The wireless device of claim 14, wherein the cryptographic key is identical to a cryptographic key that is independently generated by another wireless device at an opposite end of the reciprocal wireless channel.

17. The wireless device of claim 14, wherein the one or more channel parameters associated with the reciprocal wireless channel include one or more of multiple input multiple output or multipath characteristics associated with the reciprocal wireless channel.

18. The wireless device of claim 14, wherein the one or more processors are further configured to:
encrypt information related to the secure communication session using the cryptographic key; and
transmit the encrypted information related to the secure communication session over the reciprocal wireless channel.

19. The wireless device of claim 14, wherein the one or more processors are further configured to:
receive information related to the secure communication session over the reciprocal wireless channel; and
decrypt the received information related to the secure communication session using the cryptographic key.

20. The wireless device of claim 14, wherein the one or more processors, to establish the secure communication session, are configured to augment an encryption key used to secure communications over the reciprocal wireless channel based at least in part on the cryptographic key that is generated based on the one or more channel parameters associated with the reciprocal wireless channel.

21. The wireless device of claim 14, wherein the one or more processors, to establish the secure communication session, are configured to use the cryptographic key to securely exchange an encryption key over the reciprocal wireless channel.

22. The wireless device of claim 14, wherein the sounding waveform includes one or more of a sounding reference signal, a channel state information reference signal, a demodulation reference signal, or a phase tracking reference signal.

23. The wireless device of claim 14, wherein, to receive the sounding waveform, the one or more processors are configured to receive the sounding waveform in a beam sweep via multiple receive antennas.

24. The wireless device of claim 14, wherein the one or more channel parameters include a relative phase corresponding to one or more receive antennas.

25. The wireless device of claim 14, wherein the memory and the one or more processors are further configured to:
periodically exchange sounding waveforms over the reciprocal wireless channel to update the one or more channel parameters based at least in part on time-variant behavior associated with the reciprocal wireless channel; and
update the cryptographic key based at least in part on the one or more channel parameters that are updated using the periodically exchanged sounding waveforms.

26. The wireless device of claim 14, wherein the reciprocal wireless channel is one or more of an uplink channel, a downlink channel, a sidelink channel, or a backhaul channel.

27. A non-transitory computer-readable medium having one or more instructions for wireless communication stored thereon that,
when executed by one or more processors of a wireless device, cause the one or more processors to:
receive a sounding waveform via a reciprocal wireless channel;
estimate one or more channel parameters associated with the reciprocal wireless channel based at least in part on the sounding waveform, wherein the one or more instructions, that cause the one or more processors to estimate the one or more channel parameters, cause the one or more processors to at least one of quantize or compress the one or more channel parameters using principal component analysis;
generate a cryptographic key based at least in part on the one or more channel parameters associated with the reciprocal wireless channel; and
establish a secure communication session over the reciprocal wireless channel based at least in part on the cryptographic key.

28. An apparatus for wireless communication, comprising:
means for receiving a sounding waveform via a reciprocal wireless channel;
means for estimating one or more channel parameters associated with the reciprocal wireless channel based at least in part on the sounding waveform, wherein the means for estimating the one or more channel parameters includes at least one of means for quantizing or means for compressing the one or more channel parameters using principal component analysis;

means for generating a cryptographic key based at least in part on the one or more channel parameters associated with the reciprocal wireless channel; and means for establishing a secure communication session over the reciprocal wireless channel based at least in part on the cryptographic key.

29. The apparatus of claim 28, further comprising:

means for transmitting a sounding waveform via the reciprocal wireless channel to permit another wireless device at an opposite end of the reciprocal wireless channel to independently generate the cryptographic key based at least in part on the one or more channel parameters associated with the reciprocal wireless channel.

30. The non-transitory computer-readable medium of claim 27, wherein the one or more instructions further cause the one or more processors to:

transmit a sounding waveform via the reciprocal wireless channel to permit another wireless device at an opposite end of the reciprocal wireless channel to independently generate the cryptographic key based at least in part on the one or more channel parameters associated with the reciprocal wireless channel.

* * * * *